A. H. EUSTIS.
METHOD OF RECOVERING SULFUR DIOXID FROM GASES.
APPLICATION FILED APR. 14, 1919.
1,341,114. Patented May 25, 1920.
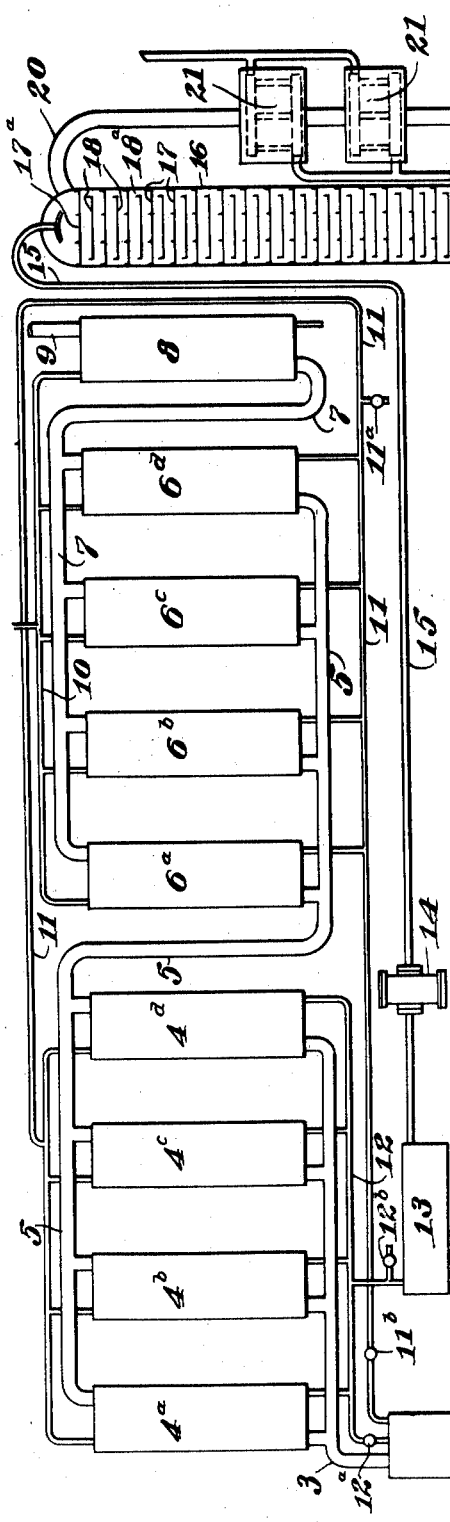
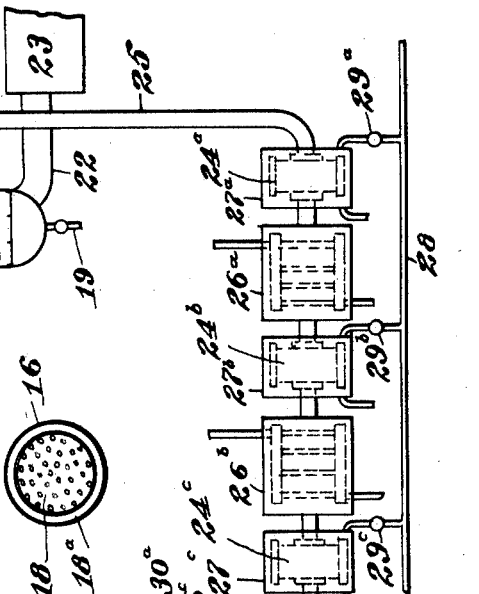
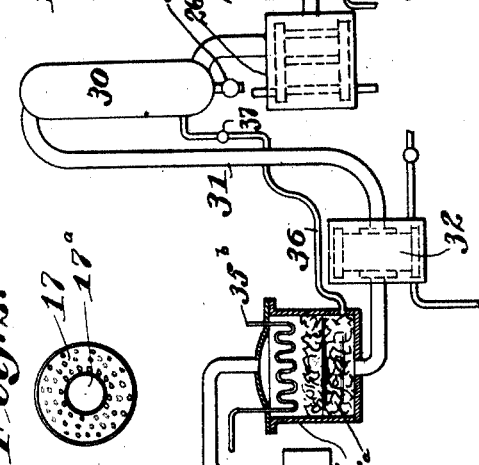
Inventor
Augustus H. Eustis
by Roberts Roberts & Cushman
his Attorneys

UNITED STATES PATENT OFFICE.

AUGUSTUS H. EUSTIS, OF MILTON, MASSACHUSETTS.

METHOD OF RECOVERING SULFUR DIOXID FROM GASES.

1,341,114.     Specification of Letters Patent.     Patented May 25, 1920.

Application filed April 14, 1919. Serial No. 289,857.

*To all whom it may concern:*

Be it known that I, AUGUSTUS H. EUSTIS, a citizen of the United States, and resident of Milton, in the county of Norfolk and State of Massachusetts, have invented new and useful Improvements in Methods of Recovering Sulfur Dioxid from Gases, of which the following is a specification.

This invention relates to a method of recovering sulfur dioxid from smelter smoke and other gases with which it may be associated, and consists in certain improvements upon and modifications of the method shown in Letters Patent of the United States No. 1,265,892, granted to Frederic A. Eustis May 14, 1918, entitled "Method and apparatus for segregating and recovering gases."

The present invention has to do principally with improvements in those steps of the process by which the sulfur dioxid is extracted from the liquor in which it has been absorbed, and by which the extracted sulfur dioxid is reduced to liquefied or condensed form suitable for commercial use.

The principal objects of the invention are to safeguard and protect the pump or pumps, by which the extracted $SO_2$ gas is handled, from the destructive effects of corrosion by the gases; to utilize a part of the $SO_2$ gas (in liquid form) made by the process to remove substantially the last traces of water or moisture from the rest of the $SO_2$ gases; to make it possible to eliminate sulfuric acid desiccators heretofore used for drying the extracted gases, and to combine in the vacuum chamber the functions of a gas extractor and a condenser for the steam engine of a power plant, thus utilizing the heat of the exhaust steam for accomplishing the extraction, eliminating the heat exchanger or making it possible to use only a small heat exchanger, and saving the heat of the exhaust steam which would otherwise be wasted.

In the accompanying drawings which illustrate in diagrammatic form apparatus for performing the improved process, Figure 1 is a diagram of the apparatus as a whole, and Figs. 2 and 3 are plans of shelves used in the vacuum extractor and its associated cooling chamber.

Gases from the furnace, smelter, or the like are led through flue 1 into the hot tower 2, the principal function of which is to cool, clean and enrich the gases. From tower 2 the gases pass through pipe or flue 3 into scrubbing towers $4^a$, $4^b$, $4^c$, $4^d$, in parallel; thence by pipe or flue 5 into scrubbing towers $6^a$, $6^b$, $6^c$, $6^d$, in parallel; thence by pipe or flue 7 into the lime tower 8; and thence by pipe or flue 9 to a stack or the atmosphere. The hot tower 2, the scrubbing towers $4^a$, etc., (which may be termed the 4-group) the scrubbing towers $6^a$, etc., (which may be termed the 6-group), and the tower 8 may all be substantially similar, and are packed with masses of broken, solid material in such form that water or liquid descending through the towers will be broken up to present extended superficial areas for contact with the gases from the furnace. The material with which the towers are packed may be coke, slag or other insoluble material, or limestone or other soluble material which will increase the capacity of the liquid for absorbing $SO_2$, or the packing may be in part such insoluble material, and in part such soluble material. Preferably the hot tower 2, and the scrubbing towers of the 4-group and the 6-group, will be packed with coke or other insoluble material, while the tower 8 will be packed with limestone, or some similar soluble material, to increase the capacity of the liquid to absorb $SO_2$, and thus remove as nearly as possible the last trace of $SO_2$ from the gases.

Water is fed to the scrubbing towers of the 6-group and to tower 8 from any suitable source of supply through pipe 10, whence it is delivered in parallel to headers or distributers at the tops of the several towers, and from the distributers flows or trickles down through the packing. The water from tower 8 flows to waste, or if it is desired to utilize all the $SO_2$, it may be conducted to either the scrubbers of the 6-group or the 4-group. The water from the towers of the 6-group is collected in pipe 11, and may be disposed of in three ways. Part of it may be delivered through valve $11^b$ into the top of the hot tower 2, where it will become heated by the incoming hot furnace gases and give up its sulfur dioxid gas thereby enriching the furnace gases which pass to the scrubbers of the 4-group; part of the water will be carried by pipe 11 and delivered into the tops of the scrubbers of the 4-group, through the several towers of which it passes in parallel; and part will probably always be wasted to the sewer through valve $11^a$.

It will be observed that both the liquids and the gases pass through the individual towers of each group in parallel, and through the groups in series. The water first passing through the scrubbers of the 6-group takes up sulfur dioxid gas which still remains in the furnace gases after their passage through the scrubbers of the 4-group, and is then further enriched as it passes through the scrubbers of the 4-group. The solution from the 4-group is collected in pipe 12, and part of it may be delivered through valve $12^a$ into the hot towers 2, where the solution will become heated and give up its gas, thereby further enriching the gas which flows to the scrubbers of the 4-group. Whether the solutions from the 4-group or the 6-group, or either of them, are delivered into the hot tower, will be determined by the operative conditions of the particular plant and the analyses of the solutions as they may be found; and such delivery may be controlled by the valves $11^b$ and $12^a$. The conditions will vary with different supplies of gas, and probably from hour to hour with the same supply of gas. The remainder of the solution from the scrubbers of the 4-group will be delivered into a storage tank 13, or wasted through valve $12^b$ if the supply exceeds the capacity of the subsequent parts of the apparatus to take care of it.

As thus far described the process and apparatus are the same as set forth in said former Patent No. 1,265,892.

From storage tank 13, which is covered to prevent the escape of $SO_2$ gas the solutions flow, aided by the pump 14 if necessary, through pipe 15 to the top of a tank or chamber 16, the upper part of which constitutes a douche tank to cool the gases and the lower part of which constitutes a vacuum extractor. The tank 16 is provided with a series of shelves or pans 17 having a central opening $17^a$ for the passage of gas, and shelves or pans 18 of less diameter than the tank 16 to leave an annular opening $18^a$ around the periphery for the passage of gas. The shelves 17 and 18 are arranged alternately as shown, and each shelf overlaps the opening of the next shelf, thus providing a tortuous or sinous passage for the gasses rising through the tank. The shelves are also perforated with a large number of small holes through which the solutions flow broken up into drops or small streams to expose superficially extensive surfaces.

The descending solutions thus broken up and spread out are subjected in the lower part of the tank 16 to the combined effect of heat and vacuum by which the $SO_2$ gas is extracted from the liquor. The heat which, combined with the vacuum, accomplishes the extraction of the gas in the extractor (the lower part of tank 16) is supplied through the exhaust steam pipe 22 leading from the steam engine, or turbine, 23, which operates the plant, or does other work, into the bottom of the extractor chamber. The vacuum is produced by the vacuum pump or pumps, hereinafter described, connected to pipe or flue 20 which leads out of the top of tank 16.

The steam entering the extractor chamber at the bottom of tank 16 heats the solution therein, thus effecting the extraction of the gas in conjunction with the vacuum, and in so doing is condensed; or if condensation in the lower part of tank 16 is not complete the exhaust steam rising through the cooling chamber in the upper part of tank 16 is therein wholly condensed.

The $SO_2$ gases extracted in the extraction chamber at the bottom of tank 16 go upward through the douche tank cooling chamber at the upper part of tank 16, passing in contact with the descending solution, broken up and spread out by the shelves 17, 18, and are thereby cooled, causing condensation of water or other liquid which may be contained in the gases, and perceptibly drying the gases. The $SO_2$ gases thus partially dried pass out from the top of the cooling chamber through pipe or flue 20. In rising through tank 16 the gases are not only cooled by the descending solution, which precipitates out considerable of the water vapor, but the solution itself is also somewhat warmed, thereby contributing to the extraction of the gases in the extractor chamber at the lower part of the tank 16.

It will be observed that the chamber 16 serves as a combined extractor for the gas and condenser for the exhaust steam, thereby utilizing the heat of the exhaust steam, now usually wasted, for assisting in recovering the gas from the liquor, and doing away with or materially reducing the size of the heat exchanger or other specially contrived source of heat for accomplishing the extraction such as that shown in said former patent.

After the gases have been extracted from the solution the liquor flows out of the bottom of the extractor through pipe 19 to waste, or to a small heat exchanger of the character shown in said Patent No. 1,265,892, if any is used.

A small amount of the gas is probably reabsorbed in the liquor as it rises through the upper part of tank 16, but as it is at all times subject to a vacuum, and as the time during which it is in contact with the liquor in the cooling chamber of tank 16 is short, the amount so reabsorbed is small, and what little is so reabsorbed again passes into the extractor chamber and is therefore recovered without loss.

From the top of the cooler or douche tank the gases go by pipe 20 to refrigerators or surface coolers 21 where they are further cooled by brine or other suitable agencies, or are refrigerated by an ammonia system or the like, and a still further part of the contained water vapor is given up. Any suitable means for cooling and thus drying the gas may be used at this stage.

From the coolers 21 the gases flow by pipe 25 to vacuum pump $24^a$ which maintains the vacuum in the extractor chamber and cooling chamber of tank 16, and in refrigerators 21. With the present invention it is possible to dispense with all sulfuric acid desiccators shown in said former patent, and to use coolers, and liquid sulfur dioxid as hereinafter described, as the desiccating means.

The gases passing through the vacuum pump $24^a$ still contain some water vapor or moisture in condensed or condensing state. Wet acid gases, that is, gases carrying liquid acids or free water or water vapor, attack and rapidly corrode the pump. I find, however, that if the gases which come in contact with the pump are dry, that is, are free of liquid acids, water or other liquid, they are practically harmless. Conceivably the gases could be rendered substantially dry and harmless by raising the temperature of the entire body of the gas above the dew point before it enters the pump, but this is costly and unnecessary provided the gas actually contacting with the walls and surfaces of the pump and its parts is raised above the dew point and thus rendered dry and non-destructive. To accomplish this I provide the pump $24^a$ with a steam jacket $27^a$ supplied with hot steam through pipe 28 from any suitable source adapted to raise the temperature of the pump $24^a$ to such point that the heat of the pump will raise the temperature of the gases in actual contact therewith above the dew point, thus depriving the gases in contact with the pump of free water, condensed or condensing vapor or other moisture. It is not necessary that the part of the gases passing through the pump but not actually bathing or contacting with its surface should be so dried, nor that heat should be expended to that end. The heat supplied to the steam jacket $27^a$ can be regulated and controlled by a valve $29^a$ or in any convenient manner.

When the apparatus is first started up the temperature of the pump is raised to the desired point by admitting steam to the steam jacket. After operation for a while a part of the heat and in some instances the whole of the heat required will be supplied by the heat of compression of the pump itself. Indeed, it may develop with some apparatus that the pump will become too hot from the heat of compression, and in that event the steam in the jacket $27^a$ may be replaced by water circulation to reduce the heat. In short, the purpose of the jacket $27^a$ is to control the heat of the pump, whether by raising or lowering the temperature, the essential condition being that the temperature of the pump be maintained at such point that the gases in immediate contact with its surfaces, that is, at least a film or layer of the gases actually contacting with the surfaces of the pump, be raised by the heat of the pump above the dew point with respect to the liquids contained in the gases.

From vacuum pump $24^a$ the gases, compressed by the pump, are delivered into a cooler $26^a$, which may be a surface cooler similar to 21, and therein cooled. The cooling of the gases in $26^a$ condenses out part of the remaining water or other liquid. Thence the gases are drawn by pump $24^b$, further compressed thereby, and delivered to another cooler $26^b$, similar to $26^a$, and therein further cooled and dried. The pump $24^b$ may be kept at the desired temperature by a jacket $27^b$, supplied with steam or other temperature controlling fluid through valve $29^b$ in the inlet pipe, in the same manner and for the same purpose as already described in connection with pump $24^a$. From cooler $26^b$ the gases are drawn by pump $24^c$, similarly inclosed in a jacket $27^c$ controlled by valve $29^c$, further compressed thereby, and delivered into another cooler $26^c$ similar to coolers $26^a$ and $26^b$, and therein further cooled and dried. From cooler $26^c$ the gases pass to cooling chamber 30, which still further cools the gases and condenses out most of the remaining water or other liquid, and the latter is removed through pipe $30^a$. In order that the coolers $26^a$, $26^b$, $26^c$ and 30 may not be vulnerable to attack by the corrosive acids, they may be made of lead.

The repeated or multiple stage compressing and cooling of the gases which takes place in the series of pumps $24^a$, $24^b$, $24^c$, and their successive coolers, progressively removes moisture from the gases with the important result that not only is the volume of the gas reduced, thus reducing the power required to handle the gas, but the steam resulting from the moisture in the gas is in part taken out at each stage and therefore does not have to be compressed at a succeeding stage, thus avoiding the expenditure of power which would otherwise be required to compress the steam. The drying of the gases which results from the repeated compressing and cooling also serves in a measure to protect the apparatus from the injurious effects of the corrosive acids, which are much more pronounced when the gases are wet than when they are dry. Although I have shown three pumps and coolers comprised in this multiple stage compressing and cooling system it will be understood that this is only by way of illustration, and two or any larger number, as desired, might be used to produce repeated compressing and cooling of the gases from the vacuum up to the final compression desired. Moreover, so far as certain of the other aspects of the invention are concerned a single pump and cooler might be used at this point.

However, if only one unit or pump is used for maintaining a vacuum on the intake side and compressing the gases on the delivery side, the compression made by a single unit is so extensive that it creates a temperature such that it is necessary or advisable to cool the pump to protect it from overheating. If the pump has to be cooled it is difficult to control the temperature so that it will not at some place in the pump fall below the dew point of the gases and damage the pump. But by gradually compressing the gases in repeated stages by a plurality of pumps, and cooling the gases to remove the water vapor between the pumps, this difficulty is overcome because the temperature of compression at each stage is much less; and although the dew point of the gas is raised somewhat at each stage of the compression, the temperature is also raised by the compression fast enough to offset this defect, with the result that the gases remain dry. Also as part of the water vapor is taken out in each of the several coolers the dew point of the gas is lowered by each cooler before the gas passes to the next pump, thus by each cooler lowering the necessary temperature for the next pump.

The gases thus cooled and dried pass out of the top of cooler 30 through pipe 31 to a compression pump 32, by which the gases are compressed and delivered into a condenser 33 cooled by brine or other agency, where they become liquefied as the combined result of pressure and low temperature. The liquefied gas is stored in a container 34.

Between the compressor 32 and the condenser 33 is a trap 35 containing liquid sulfur dioxid, which acts as a desiccator to absorb the last traces of moisture from the gas. This desiccator trap 35, as herein shown, is a closed vessel containing coke $35^a$ or other insoluble broken material to break up the liquid. It may be cooled by a water cooling coil $35^b$ of lead pipe to such temperature as to cause a little but not all of the $SO_2$ to liquefy in the trap at the pressure therein.

A certain amount of liquid $SO_2$ produced by the process will collect in the trap 35 and absorb the last traces of moisture from the compressed gas passing therethrough from the compressor 32. Liquid $SO_2$ can hold only small amounts of water, but as the water content of the gas is now very small it will be effectively absorbed by the liquid $SO_2$ and it has been found in practice that only about .2% of water will remain in the sulfur dioxid in the condenser 33.

The liquid $SO_2$ in trap 35 with its content of absorbed water may be blown back through the pipe 36 controlled by a valve 37 into the cooler 30. It expands in cooler 30 on account of the sudden drop in pressure from trap 35 to cooler 30, thus refrigerating the cooler, and also gives up at least a part of the absorbed moisture which is condensed out in the cooler.

Thus a part of the liquid $SO_2$ produced by the process is used to get out substantially the last traces of water from the rest of the $SO_2$ gas.

The compressor 32 is preferably jacketed in the same manner as the pumps $24^a$, $24^b$, etc., to control the temperature of the pump and keep it hot enough to raise the contacting gases above the dew point and so save the pump from corrosion. There is, however, less necessity for this than in the case of the other pumps because the gases come to the compression pump 32 drier than to the other pumps, having given up most of their remaining moisture in cooler 30.

I claim:

1. The method of obtaining sulfur dioxid from material containing the same, which comprises extracting the gas by subjecting the material to the combined effect of heat and vacuum, passing the extracted sulfur dioxid gas through the vacuum producing means, and maintaining the temperature of the vacuum producing means at a point adapted to raise the temperature of the gases in immediate contact with the vacuum producing means above the dew point with respect to their contained liquids.

2. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter compressing and cooling the gas, and maintaining the temperature of the compressing means at a point adapted to keep the temperature of the gases in immediate contact therewith above the dew point with respect to their contained liquids.

3. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter compressing and cooling the gas, and maintaining the temperature of the compressing means at a point adapted to keep the temperature of the gases in immediate contact therewith above the dew point with respect to their contained liquids, and thereafter absorbing substantially the last traces of moisture from the gas by bringing the gas into contact with liquid sulfur dioxid.

4. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter compressing and cooling the gas, and maintaining the temperature of the compressing means at a point adapted to keep the temperature of the gases in immediate contact therewith above the dew point with respect to their contained liquids, and thereafter liquefying a part of the sulfur dioxid gas and absorbing substantially the last traces of moisture from the rest of the gas by bringing it into contact with the part so liquefied.

5. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter repeatedly and progressively compressing the gas and alternately cooling it, and maintaining the temperature of the several compressing means at a point adapted to keep the temperature of the gases in immediate contact therewith above the dew point with respect to their contained liquids.

6. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter repeatedly and progressively compressing the gas and alternately cooling it, and maintaining the temperature of the several compressing means at a point adapted to keep the temperature of the gases in immediate contact therewith above the dew point with respect to their contained liquids, and thereafter absorbing substantially the last traces of moisture from the gas by bringing the gas into contact with liquid sulfur dioxid.

7. The method of depriving a gas of contained water vapor or moisture, which comprises absorbing the water vapor or moisture from the gas by bringing the gas into intimate contact with liquid sulfur dioxid at a temperature above that at which hydrate of gaseous sulfurous acid is crystallized.

8. The method of depriving sulfur dioxid gas of water vapor or moisture contained therein, which comprises absorbing the water vapor or moisture from the gas by bringing the sulfur dioxid gas into intimate contact with liquid sulfur dioxid at a temperature above that at which hydrate of gaseous sulfurous acid is crystallized.

9. The method of obtaining sulfur dioxid from material containing the same, which comprises extracting the gas by subjecting the material to the combined effect of heat and vacuum, compressing the extracted sulfur dioxid gas and liquefying a part at least thereof, and utilizing the part so liquefied to absorb moisture from the rest of the gas at a temperature above that at which hydrate of gaseous sulfurous acid is crystallized.

10. The method of obtaining sulfur dioxid from material containing the same, which comprises extracting sulfur dioxid gas from the material, cooling the extracted gas to precipitate out of it part of its contained moisture, and absorbing from the gas a still further part of its contained moisture by bringing the gas into intimate contact with liquid sulfur dioxid at a temperature above that at which hydrate of gaseous sulfurous acid is crystallized.

11. The method of obtaining sulfur dioxid from material containing the same, which comprises extracting sulfur dioxid gas from the material, cooling the extracted gas to precipitate out of it part of its contained moisture, liquefying a part of said partially dried sulfur dioxid gas, and absorbing moisture from the rest of the gas by bringing it into contact with the part so liquefied at a temperature above that at which hydrate of gaseous sulfurous acid is crystallized.

12. The method of obtaining sulfur dioxid from material containing the same, which comprises extracting the gas by subjecting the material to the combined effect of heat and vacuum, compressing the extracted sulfur dioxid gas and liquefying a part at least thereof, and absorbing moisture from the compressed gas by bringing the compressed gas into contact with the part so liquefied at a temperature above that at which hydrate of gaseous sulfurous acid is crystallized.

13. The method of obtaining sulfur dioxid from material containing the same, which comprises extracting the gas by subjecting the material to the combined effect of heat and vacuum, compressing the extracted sulfur dioxid gas and liquefying a part at least thereof, and absorbing moisture from the compressed gas by passing the compressed gas through a body of the part so liquefied at a temperature above that at which hydrate of gaseous sulfurous acid is crystallized.

14. The method of obtaining sulfur dioxid from material containing the same, which comprises extracting the gas by subjecting the material to the combined effect of heat and vacuum, alternately and repeatedly compressing and cooling the extracted gas to deprive it of moisture, and removing the moisture condensed out of the gas at the several cooling stages.

15. The method of obtaining sulfur dioxid from material containing the same, which comprises extracting the gas by subjecting the material to the combined effect of heat and vacuum, alternately and repeatedly compressing and cooling the extracted gas to deprive it of part of its contained moisture, removing the moisture condensed out of the gas at the several cooling stages, and thereafter bringing the gas into intimate contact with liquid sulfur dioxid to absorb from the gas a still further part of its contained moisture.

16. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter repeatedly and progressively compressing the gas and removing moisture from the gas by cooling it after the several stages of compression, and maintaining the temperature of the several compressing means at a point adapted to keep the temperature of the gases in immediate contact therewith above the dew point with respect to their contained liquids.

17. The method of obtaining sulfur dioxid from material containing the same, which comprises extracting the gas by subjecting the material to the combined effect of heat and vacuum, passing the extracted sulfur dioxid gas through the vacuum producing means, maintaining the temperature of the vacuum producing means at a point adapted to keep the temperature of the gases in immediate contact therewith above the dew point with respect to their contained liquids, thereafter repeatedly and progressively compressing the gas and removing moisture from the gas by cooling it after the several stages of compression, and maintaining the temperature of the several compressing means at a point adapted to keep the temperature of the gases in immediate contact therewith above the dew point with respect to their contained liquids, and thereafter absorbing substantially the last traces of moisture from the gas by bringing the gas into contact with liquid sulfur dioxid.

18. The method of treating sulfur dioxid gas containing moisture, which comprises compressing the gas and maintaining the temperature of the compressing means at a point adapted to keep the temperature of the gas in immediate contact with the compressing means above the dew point with respect to its contained liquid.

19. The method of treating sulfur dioxid gas containing moisture, which comprises repeatedly and progressively compressing the gas, and alternately depriving it of liquid, and maintaining the temperature of the several compressing means at a point adapted to keep the temperature of the gas in immediate contact with the compressing means above the dew point with respect to its contained liquid.

20. The method of treating sulfur dioxid gas containing moisture, which comprises compressing the gas and maintaining the temperature of the compressing means at a point adapted to keep the temperature of the gas in immediate contact with the compressing means above the dew point with respect to its contained liquid, and thereafter absorbing substantially the last traces of moisture from the gas by bringing the gas into contact with liquid sulfur dioxid.

21. The method of treating sulfur dioxid gas containing moisture, which comprises compressing the gas and maintaining the temperature of the compressing means at a point adapted to keep the temperature of the gas in immediate contact with the compressing means above the dew point with respect to its contained liquid, and thereafter liquefying a part of the sulfur dioxid gas and absorbing substantially the last traces of moisture from the rest of the gas by bringing it into contact with the part so liquefied.

22. The method of treating sulfur dioxid gas containing moisture, which comprises alternately and repeatedly compressing and cooling the gas to deprive it of moisture, and removing the moisture condensed out of the gas at the several cooling stages.

23. The method of treating sulfur dioxid gas containing moisture, which comprises alternately and repeatedly compressing and cooling the gas to deprive it of moisture, and removing the moisture condensed out of the gas at the several cooling stages, and thereafter bringing the gas into intimate contact with liquid sulfur dioxid to absorb from the gas a still further part of its contained moisture.

Signed by me at Boston, Massachusetts this 8th day of April 1919.

AUGUSTUS H. EUSTIS.